US012031360B2

(12) United States Patent
Thompson

(10) Patent No.: US 12,031,360 B2
(45) Date of Patent: Jul. 9, 2024

(54) DOOR LATCH ASSEMBLY FOR A WORK MACHINE

(71) Applicant: DEERE & COMPANY, Moline, IL (US)

(72) Inventor: Michael W. Thompson, Clayton, IN (US)

(73) Assignee: DEERE & COMPANY, Moline, IL (US)

( * ) Notice: Subject to any disclaimer, the term of this patent is extended or adjusted under 35 U.S.C. 154(b) by 108 days.

(21) Appl. No.: 17/568,997

(22) Filed: Jan. 5, 2022

(65) Prior Publication Data

US 2022/0275669 A1 Sep. 1, 2022

Related U.S. Application Data

(60) Provisional application No. 63/153,979, filed on Feb. 26, 2021.

(51) Int. Cl.
*E05B 81/20* (2014.01)
*E05B 81/06* (2014.01)
(Continued)

(52) U.S. Cl.
CPC .............. *E05B 81/20* (2013.01); *E05B 81/06* (2013.01); *E05B 81/14* (2013.01); *E05B 81/34* (2013.01); *E05B 81/66* (2013.01); *E05B 83/36* (2013.01)

(58) Field of Classification Search
CPC .......... E05B 81/06; E05B 81/14; E05B 81/20; E05B 81/28; E05B 81/34; E05B 81/46; E05B 81/66; E05B 83/36
See application file for complete search history.

(56) References Cited

U.S. PATENT DOCUMENTS 5,639,130 A * 6/1997 Rogers, Jr. .............. E05B 81/20 292/201
6,158,787 A 12/2000 Kutschat
(Continued)

FOREIGN PATENT DOCUMENTS

DE 10134931 A1 2/2003
DE 10144325 A1 5/2003
(Continued)

OTHER PUBLICATIONS

German Search Report issued in application No. DE102022201205.4, dated Jan. 19, 2023, 16 pages.
(Continued)

*Primary Examiner* — Kristina R Fulton
*Assistant Examiner* — James Edward Ignaczewski
(74) *Attorney, Agent, or Firm* — Taft Stettinius & Hollister LLP; Stephen F. Rost

(57) ABSTRACT

A door latch assembly is positionable between an unlatched position, an intermediate position, and a latched position. The door latch assembly includes a housing, a drive mechanism disposed within the housing, a rotor pivotally coupled to the housing and disposed therein, and a catch assembly pivotally coupled to the housing and disposed therein. The rotor has an outer surface which forms at least two notches. A bearing is rotatably coupled to the catch assembly. In the unlatched position, the bearing is located in contact with the outer surface but not within either of the at least two notches. In the intermediate position, the bearing is located in a first notch and in the latched position the bearing is located in a second notch.

18 Claims, 9 Drawing Sheets

(51) Int. Cl.

| | |
|---|---|
| ***E05B 81/14*** | (2014.01) |
| ***E05B 81/34*** | (2014.01) |
| ***E05B 81/66*** | (2014.01) |
| ***E05B 83/36*** | (2014.01) |

(56) References Cited

U.S. PATENT DOCUMENTS

| | | | | |
|---|---|---|---|---|
| 6,386,599 | B1 * | 5/2002 | Chevalier | E05B 77/28 292/201 |
| 6,419,284 | B1 | 7/2002 | Kutschat | |
| 7,360,803 | B2 | 4/2008 | Parent et al. | |
| 7,766,397 | B2 | 8/2010 | Carabalona | |
| 8,528,950 | B2 * | 9/2013 | Organek | H01F 7/1638 292/216 |
| 8,827,327 | B2 | 9/2014 | Kutschat | |
| 9,758,995 | B2 | 9/2017 | Kalsi et al. | |
| 10,370,868 | B2 | 8/2019 | Komkin | |
| 10,745,947 | B2 | 8/2020 | Okeke et al. | |
| 10,822,861 | B2 | 11/2020 | Ottolini et al. | |
| 11,180,934 | B2 | 11/2021 | Ney et al. | |
| 2004/0056489 | A1 * | 3/2004 | Boecker | E05B 81/21 292/201 |
| 2013/0049378 | A1 | 2/2013 | Kutschat | |
| 2015/0069766 | A1 * | 3/2015 | Estrada | E05B 77/12 292/194 |
| 2016/0215532 | A1 | 7/2016 | Farrenkothen | |
| 2016/0251879 | A1 | 9/2016 | Behnke | |
| 2017/0051540 | A1 * | 2/2017 | Okeke | E05B 85/26 |
| 2018/0087294 | A1 | 3/2018 | Martinez et al. | |
| 2018/0163439 | A1 * | 6/2018 | Patane | E05B 77/36 |
| 2018/0252001 | A1 * | 9/2018 | Zhang | E05B 81/06 |
| 2019/0153766 | A1 | 5/2019 | Knappe et al. | |
| 2020/0131808 | A1 * | 4/2020 | Kim | E05B 81/34 |
| 2020/0284068 | A1 | 9/2020 | Cumbo et al. | |
| 2021/0032913 | A1 | 2/2021 | Estrada et al. | |
| 2021/0148143 | A1 | 5/2021 | Ney et al. | |
| 2022/0010602 | A1 | 1/2022 | La Porte | |
| 2022/0042352 | A1 | 2/2022 | Ney et al. | |
| 2022/0042353 | A1 * | 2/2022 | Komkin | E05B 81/20 |
| 2022/0259901 | A1 * | 8/2022 | Cumbo | E05B 81/06 |

FOREIGN PATENT DOCUMENTS

| | | | | |
|---|---|---|---|---|
| DE | 10216845 | A1 | 11/2003 | |
| DE | 102013016055 | A1 * | 4/2015 | E05B 81/66 |
| DE | 102013016055 | A1 | 4/2015 | |
| EP | 2433865 | A2 * | 3/2012 | B64C 25/26 |
| EP | 3412853 | A1 * | 12/2018 | |

OTHER PUBLICATIONS

D. La Porte, Series 5500, <URL: https://dlp-laporte.com/en/products/latches/door-and-cab-latches/series-5500>, accessed Mar. 20, 2023, 2 pages.

Inteva Products, Door Systems, <URL: https://www.intevaproducts.com/products/closure-systems/door-systems>, accessed Mar. 20, 2023, 3 pages.

Inteva Products, Latch Systems, <URL: https://www.intevaproducts.com/products/closure-systems/latching-systems>, accessed Mar. 20, 2023, 4 pages.

Door latches from D. La Porte and Inteva Products, publicly available before Feb. 2021.

* cited by examiner

DOOR LATCH ASSEMBLY FOR A WORK MACHINE

RELATED APPLICATIONS

This application claims priority to U.S. Provisional Application Ser. No. 63/153,979, filed Feb. 26, 2021, the disclosure of which is hereby incorporated by reference in its entirety.

FIELD OF THE DISCLOSURE

The present disclosure relates to a door latch assembly on a work machine.

BACKGROUND

Conventional door latch assemblies are utilized in vehicles and machines for gaining access to an interior that is partially closed by a door. In work machines, particularly those in the agricultural, construction, and forestry industries, conventional door latches are often large and require external actuators to perform certain functions such as a power release. The release force can be significant, thus requiring the external actuator. With an external actuator, it is difficult to package the door latch assembly in a door of a machine. It often requires separate components mounted or coupled in various locations, rather than a single component.

There is a need for a door latch assembly for use with a work machine that has a compact packaging arrangement without requiring an external actuator.

SUMMARY

In one embodiment of the present disclosure, a door latch assembly includes a housing; a drive mechanism disposed within the housing, the drive mechanism being controllable to provide output torque; a geartrain assembly operably driven by the drive mechanism; a clutch assembly controllable between a disengaged position and an engaged position; a rotor comprising a body rotatably coupled to the housing, the body having an outer surface and at least two notches defined in the outer surface; a catch assembly rotatably coupled to the housing, the catch assembly including a first end and a second end; and a bearing rotatably coupled to the catch assembly; wherein in a first position, the bearing is disposed in the first notch; in a second position, the bearing is disposed in the second notch; in a third position, the bearing is located in neither notch.

In one example of this embodiment, the door latch assembly includes a solenoid located within the housing, the solenoid including a plunger which is movable between an extended and retracted position. In a second example, the solenoid is controllable between an energized state and a de-energized state; in the de-energized state, the plunger is in its retracted position and spaced from the catch assembly; in the energized state, the plunger is in its extended position and moves into contact with the catch assembly. In a third example, the door latch assembly includes a remote control for controlling the solenoid from its de-energized state to its energized state.

In a fourth example, the housing comprises an opening for a manual release mechanism for removing the bearing from one of the notches. In a fifth example, the rotor is rotatable about a first axis; the catch assembly is rotatable about a second axis; the bearing is rotatable about a third axis; the first, second and third axes are offset but parallel to one another. In a sixth example, the door latch assembly includes a slot defined in the housing, the slot including a first end and a second end; a pin integrally formed in the rotor, the pin moving through the slot between the first and second ends as the door latch assembly is configured between an unlatched position and a latched position.

In a seventh example, the drive mechanism comprises an electric motor. In an eighth example, the door latch assembly includes a pinion gear coupled to the rotor such that when the clutch assembly is in its engaged position, output torque from the drive mechanism is transferred through the geartrain assembly, the clutch assembly, and the pinion gear to rotatably drive the rotor. In a ninth example, the housing comprises a first opening configured to receive a striker on a door frame; the rotor comprises a second opening configured to receive the striker in an unlatched position of the door latch assembly; further wherein, the first opening and second opening are at least partially aligned with one another in the unlatched position. In a tenth example, the door latch assembly includes a pair of switches movable between an open position and a closed position; wherein, in the first position, the pair of switches are in their open positions; wherein, in the second position, a first switch of the pair of switches is in the closed position and a second switch of the pair of switches in the open position; wherein, in the third position, the first switch is in the open position and the second switch is in the closed position.

In another embodiment of the present disclosure, a door latch assembly of a work machine is positionable between an unlatched position, an intermediate position, and a latched position, the door latch assembly includes a housing defining an interior space; a drive mechanism disposed within the interior space, the drive mechanism being controllable to produce output torque; a rotor pivotally coupled to the housing and disposed within the interior space, the rotor comprising an outer surface which includes at least two notches defined therein; a catch assembly pivotally coupled to the housing and disposed within the interior space; and a bearing rotatably coupled to the catch assembly; wherein, in the unlatched position, the bearing is located in contact with the outer surface but not within either of the at least two notches; wherein, in the intermediate position, the bearing is located in a first notch of the at least two notches; wherein, in the latched position, the bearing is located in a second notch of the at least two notches.

In one example of this embodiment, the door latch assembly includes a pair of switches movable between an open position and a closed position; wherein, in the intermediate position, the pair of switches are in their open positions; wherein, in the unlatched position, a first switch of the pair of switches is in the closed position and a second switch of the pair of switches in the open position; wherein, in the latched position, the first switch is in the open position and the second switch is in the closed position. In a second example, the door latch assembly includes a slot defined in the housing, the slot including a first slot end and a second slot end such that the rotor moves within the slot between the first and second slot ends; wherein, in the unlatched position, the rotor is located at the first slot end; wherein, in the intermediate position, the rotor is located between the first and second slot ends; wherein, in the latched position, the rotor is located at the second slot end.

In another example, the door latch assembly includes a solenoid located within the housing, the solenoid including a plunger which is movable between an extended position and retracted position. In yet another example, the bearing comprises a needle bearing. In a further example, the rotor pivots about a first axis and the catch assembly pivots about a second axis; the rotor pivots about the first axis in a first direction and the catch assembly pivots about the second axis in a second direction when the door latch assembly is moved from the unlatched position to the latched position; the rotor pivots about the first axis in a first direction and the catch assembly pivots about the second axis in a second direction when the door latch assembly is moved from the unlatched position to the latched position; the rotor pivots about the first axis in the second direction and the catch assembly pivots about the second axis in the first direction when the door latch assembly is moved from the latched position to the unlatched position.

In a further embodiment of the present disclosure, a control system of a work machine includes a controller; and a door latch assembly being controllable between an unlatched position, an intermediate position, and a latched position, the door latch assembly comprising a housing defining an opening for receiving a striker and a slot having a first slot end and a second slot end; a drive mechanism disposed within the housing, the drive mechanism being controllable to provide output torque; a geartrain assembly operably driven by the drive mechanism; a clutch assembly controllable between a disengaged position and an engaged position; a rotor comprising a body pivotally coupled to the housing, the body having an outer surface and at least two notches defined in the outer surface; a catch assembly pivotally coupled to the housing, the catch assembly including a first end and a second end; and a bearing rotatably coupled to the catch assembly; wherein, in the unlatched position, the bearing is in contact with the outer surface of the rotor and the rotor is located at the first slot end of the slot; wherein, in the intermediate position, the bearing is disposed in a first notch of the at least two notches and the rotor is located between the first slot end and the second slot end; wherein, in the latched position, the bearing is disposed in a second notch of the at least two notches and the rotor is located at the second slot end.

In one example of this embodiment, the control system includes a solenoid located within the housing, the solenoid including a plunger which is movable between an extended position and retracted position; and a remote control disposed in communication with the controller or solenoid, the remote control being actuable to energize the solenoid to move the door latch assembly from the latched position to the unlatched position; wherein, when the solenoid is energized, the plunger is moved from its retracted position to its extended position; wherein, in the extended position, the plunger contacts the catch assembly to pivot it about a first pivot axis such that the bearing is removed from being disposed in the second notch; wherein, as the bearing is removed from the second notch, the rotor pivots about a second pivot axis and the bearing is moved from the first notch to being in contact with the outer surface of the rotor in the unlatched position.

In another example, in the latched position, the rotor is operably pivoted about a first axis to induce movement of the bearing from the second notch to being in contact with the outer surface of the rotor without being located in either of the at least two notches.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
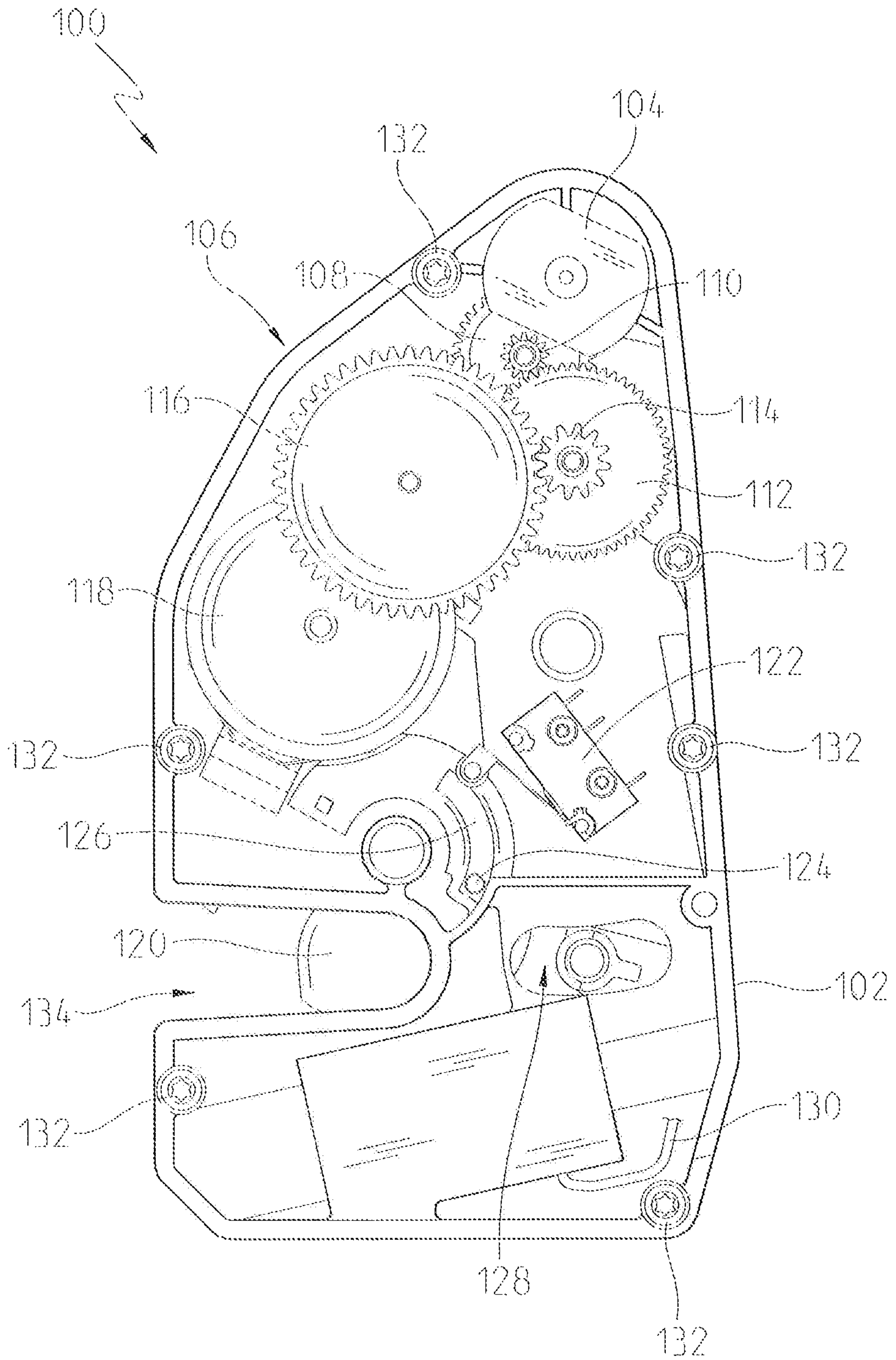
FIG. 1 is a partial section of a first side view of a door latch assembly for a work vehicle in its open position according to the present disclosure.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In the present disclosure, a door latch assembly capable of a power cinching and release functionality with a low release effort or force is disclosed. Specifically, the present disclosure provides one or more embodiments of a door latch assembly that includes a bearing assembly incorporated in a catch assembly to eliminate or reduce friction between the catch assembly and a rotor. This elimination or reduction of friction thereby reduces the overall release force. Further, the present disclosure provides one or more embodiments of a door latch assembly which includes an internally packaged actuator or motor to drive the cinching and release functionality. Moreover, the present disclosure provides one or more embodiments of a latch assembly designed to be modular so the latch can be configured for various options within the same package including, but not limited to, a manual door latch, a power cinch door latch, a power cinch door latch with a remote release, and a manual latch with a remote release.

Figure 2:
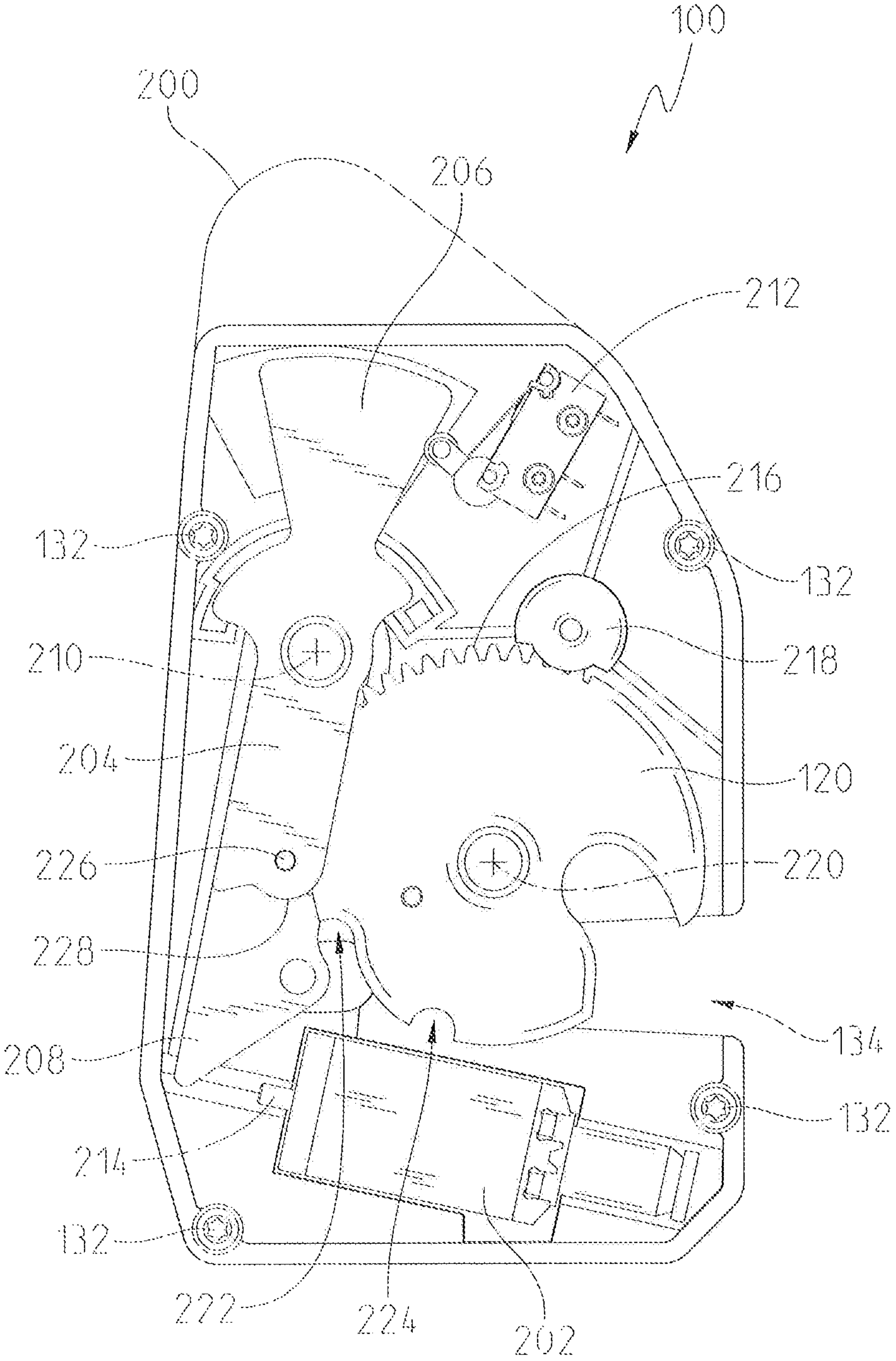
FIG. 2 is a partial section of a second side view of the door latch assembly of FIG. 1 in its open position.

Referring now to FIGS. 1 and 2, a door latch assembly 100 is illustrated in an open position. Here, the door latch assembly 100 may be positioned on a door of a work machine such a combine, tractor, or other machine. In the open position, the door latch assembly 100 may be configured to receive any conventional striker, post, or other structure located on a door frame of the machine.

The door latch assembly may include an outer housing 102 that encloses the majority of the components of the assembly. In FIG. 1, a first portion 102 of the housing is shown, whereas in FIG. 2 a second portion 200 thereof is illustrated. The first portion 102 and second portion 200 may be removably coupled to one another in one embodiment. For example, a plurality of fasteners 132 may be used to couple the first portion 102 and second portion 200 to one another. In another embodiment, the two portions may be integrally formed as a single housing. For instance, the housing portions may be welded, glued, or otherwise integrally formed with one another to form a housing.

In FIG. 1, a drive mechanism 104 is shown for driving a geartrain assembly 106. The drive mechanism 104 may be a motor, for example. The motor may be an electric motor or any other known type of motor. In any event, the drive mechanism 104 may operably be powered to provide a torque input to the geartrain assembly 106. The geartrain assembly 106 may include a plurality of gears. In FIG. 1, the geartrain assembly 106 may include a first gear 108, a second gear 110, a third gear 112, a fourth gear 114, and a fifth gear 116. The drive mechanism 104 may operably drive the first gear 108, which in turn rotates the second 110. The second gear 110 may include a plurality of teeth which are in a meshing engagement with a plurality of teeth of the third gear 112. Thus, the second gear 110 rotates the third gear 112. In turn, the third gear 112 operably rotates the fourth gear 114, and the fourth gear 114 may include a plurality of teeth which are in a meshing engagement with a plurality of teeth on the fifth gear 116 for driving the fifth gear 116.

A clutch assembly 118 may be provided between the geartrain assembly 106 and a rotor 120. The rotor 120 will be described in further detail below, but it is partly shown in FIG. 1 and illustrated in more detail in FIGS. 2, 8A, and 8B.

Figure 3:
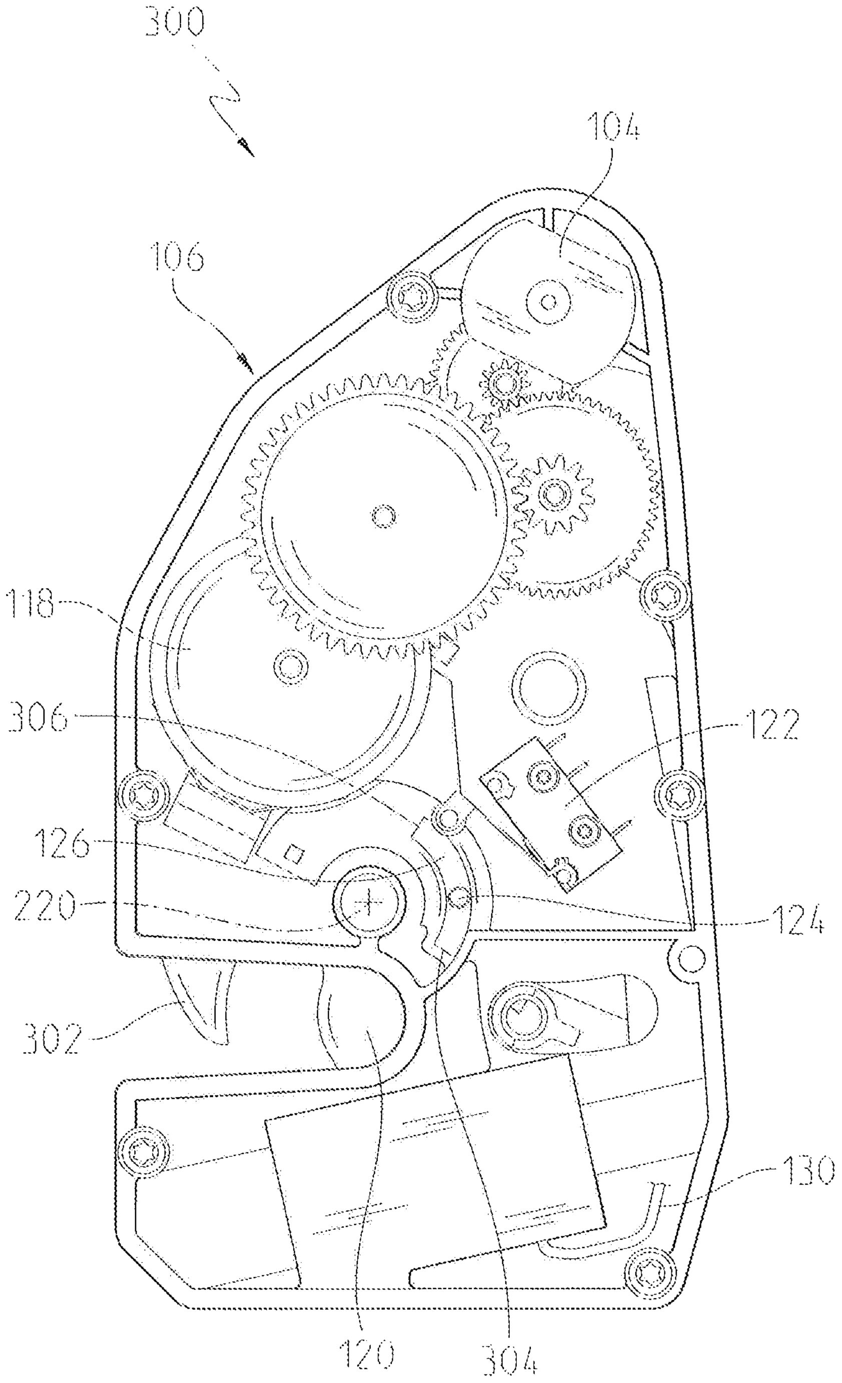
FIG. 3 is a partial section of the first side view of the door latch assembly in an intermediate position.

The door latch assembly 100 may include several micro switches. In FIG. 1, for example, a first switch 122 is shown. A second switch 212 is shown in FIG. 2. The switches enable a controller to determine the position of the door latch assembly, i.e., whether it is open, closed, or inbetween. The rotor 120 may include a pin 124 that is configured to move within a slot 126 defined in the housing 102. In FIG. 1, the pin 124 is located in the slot away from the first switch 122. In this position, the switch may be open and the controller (not shown) is able to detect that the door latch assembly 100 is not closed. As best shown in FIG. 3, the slot 126 may include a first end 304 and a second end 306. In the open position of FIG. 1, the pin 124 is located near the first end 304 of the slot 126.

The housing 102 may include a manual release opening 128 as shown in FIG. 1. The manual release opening 128 may be disposed in a location where a manual lever, handle, button, or the like may be for manually releasing the door latch assembly 100 when it is in its closed or latched position. When the door latch assembly 100 is not configured for manual release, there may be no structure located in the opening for manual release.

In FIGS. 1 and 2, the door latch assembly 100 may include a solenoid 202 for use with a remote release function. The solenoid 202 may include a cable 130 that extends from the solenoid to a remote release button, switch, or control. Upon triggering the remote release control, the solenoid 202 may be energized and thus induce a plunger 214 to move outwardly and into contact with a catch assembly 204. This is shown best in FIG. 2 and will be described in more detail below.

In an alternative embodiment, a motor (not shown) may be used in place of the solenoid 202. The motor may be an electric motor, a pneumatic motor, a hydraulic motor, or a combination thereof. Further, the motor may be any known type of motor. The motor may receive a signal (i.e., be energized or activated) and in turn drive another element such as a stem, screw, rod, beam, plunger, etc. Upon being energized or activated, the motor may operably drive the element between an extended and retracted positions. Similar to the aforementioned plunger 214, in another embodiment, the element may also be operably driven to move into contact with the catch assembly 204.

For purposes of this disclosure, a solenoid is shown through the drawings to illustrate one embodiment. A motor may alternatively replace the solenoid in other embodiments. In several embodiments, any device capable of being activated or energized whether by an electric signal or otherwise may be used in place of the solenoid or motor. Moreover, the device may operably drive a movable mechanism (e.g., plunger 214, screw, stem, bolt, rod, etc.) between an extended position (where it may contact the catch assembly 204) and a retracted position (where it does not contact the catch assembly 204).

Figure 4:
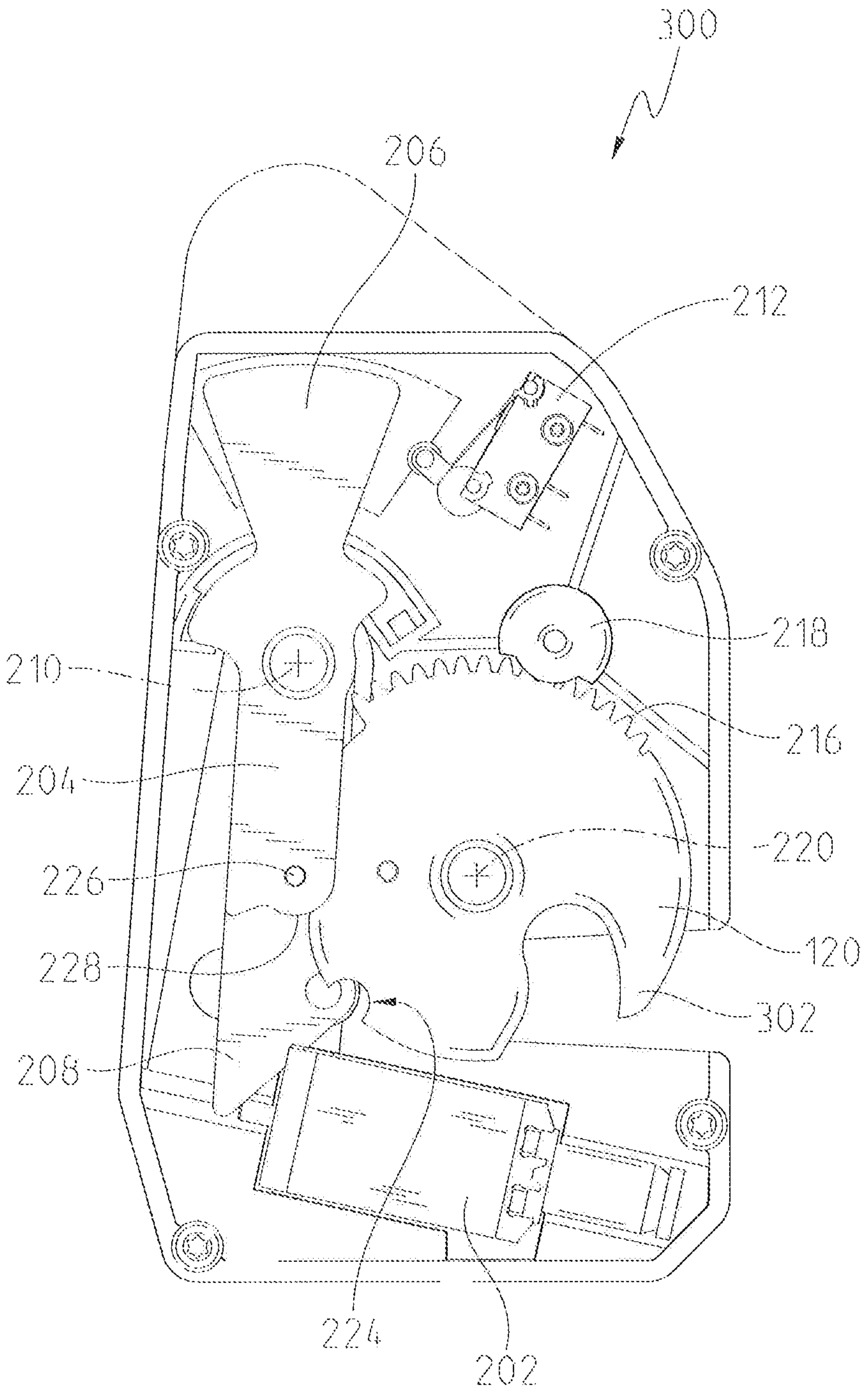
FIG. 4 is a partial section of the second side view of the door latch assembly in its intermediate position.
Figure 5:
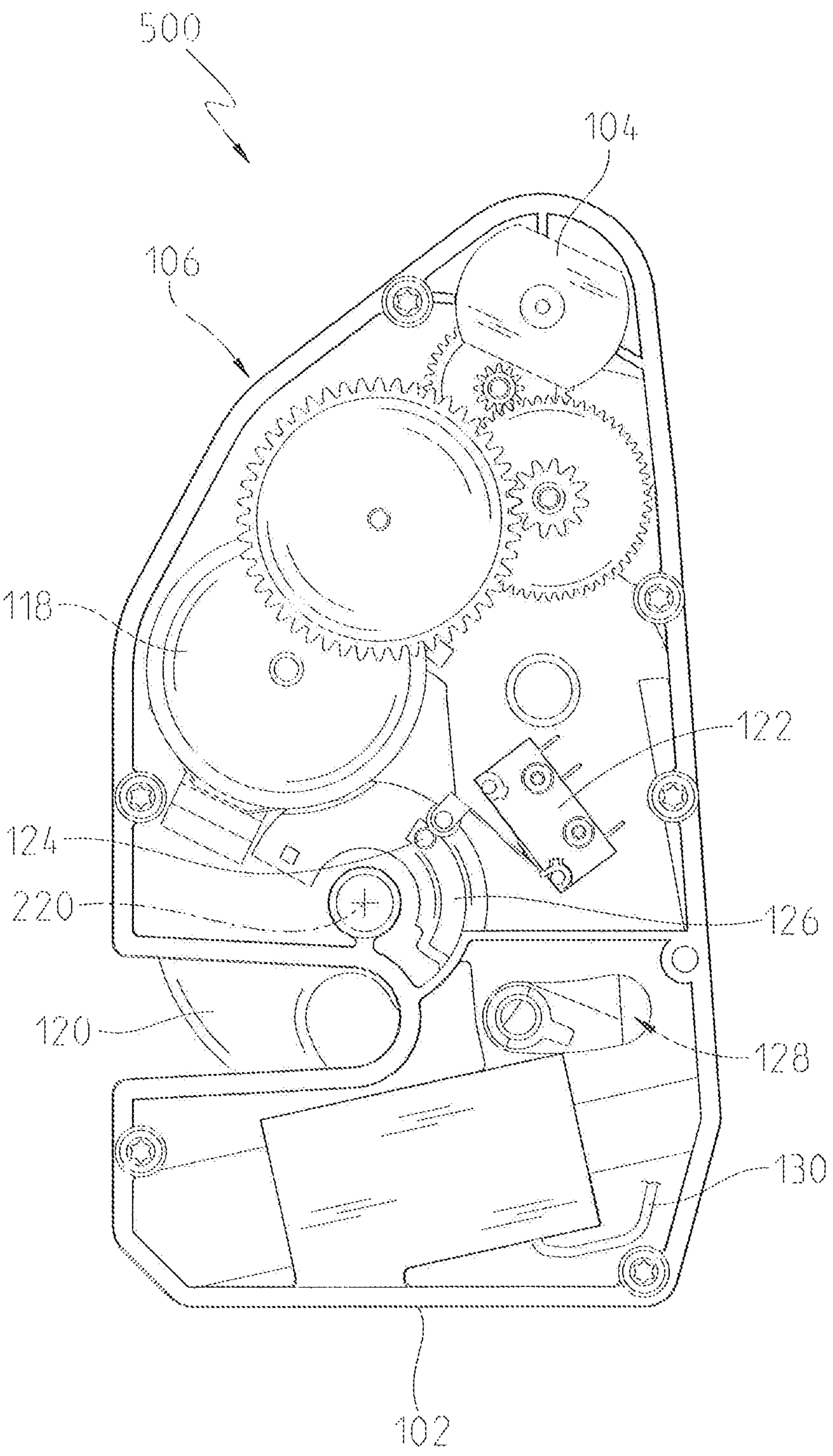
FIG. 5 is a partial section of the first side view of the door latch assembly in a closed position.

As described above, the door latch assembly 100 is shown in FIGS. 1 and 2 to be in its open or unlatched position. As shown, the housing 102 forms an opening 134 whereby as the door (not shown) is closed such that a door striker (not shown) may enter the opening 134 and contact the rotor 120. As it does, the rotor 120 may pivot to an intermediate position 300 shown in FIGS. 3 and 4. This will be described further below.

Figure 7:
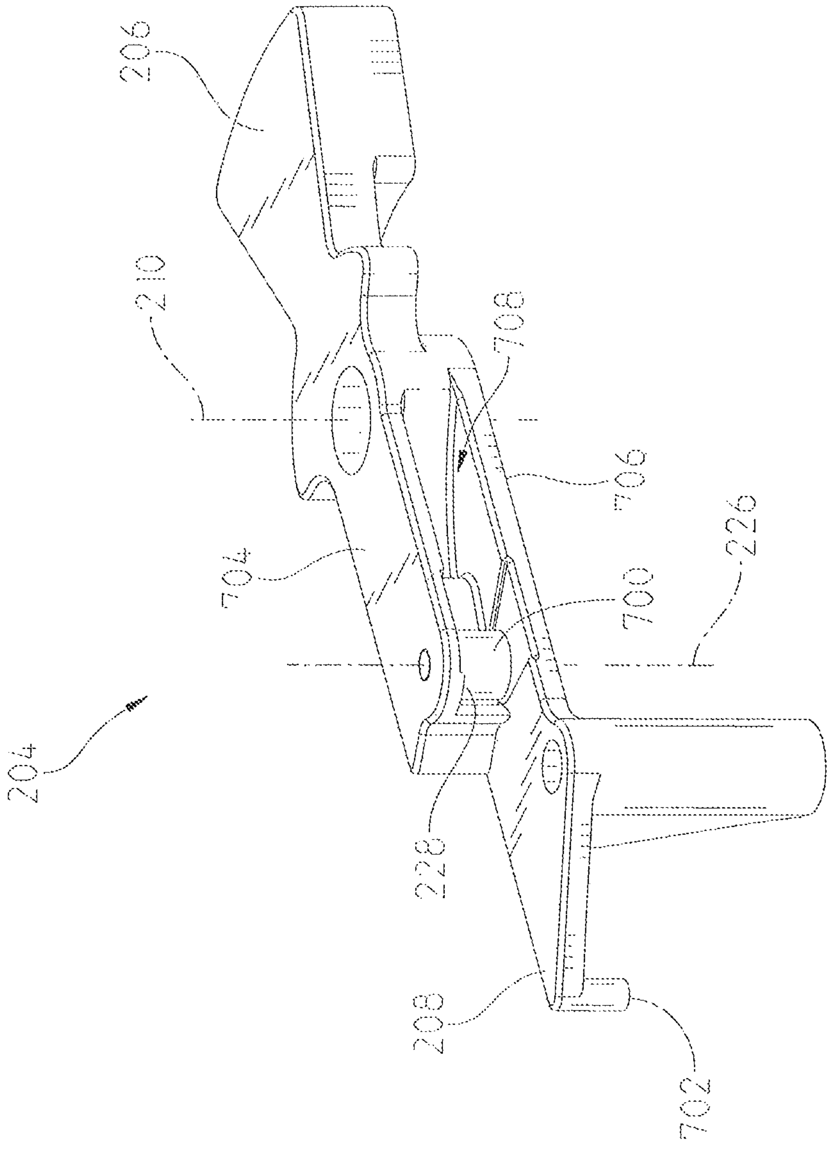
FIG. 7 is a perspective view of a catch assembly of the door latch assembly of FIG. 1.

Referring to FIG. 2, the door latch assembly 100 is shown but from the opposite side. Here, the rotor 120 and catch assembly 204 are shown in more detail. Referring to FIGS. 2 and 7, the catch assembly 204 may include a first catch end 206 and a second catch end 208. When the solenoid 202 is energized, its plunger 214 may move into contact with the second end 208 of the catch assembly 204 such that the catch assembly 204 may pivot about a catch pivot axis 210. In particular, the plunger 214 may contact a pin 702 located on the second end 208 of the catch assembly 204. As this happens, the catch assembly 204 may rotate about the pivot axis 210 in a clockwise direction.

In an alternative embodiment, the motor (not shown) may be energized or activated such that the element (e.g., screw, stem, rod, etc.) may move into contact with the second end 208 of the catch assembly 204 such that the catch assembly 204 may pivot about a catch pivot axis 210. In particular, the element may contact a pin 702 located on the second end 208 of the catch assembly 204. As this happens, the catch assembly 204 may rotate about the pivot axis 210 in a clockwise direction.

In the open position of FIGS. 1 and 2, the first end 206 of the catch assembly 204 is located in close proximity to the second switch 212. Further, the first end 206 may contact the second switch 212 such that the second switch 212 is closed. As this happens, a signal may be detected by the controller (not shown) to determine the door latch assembly 100 is in its open position. In other words, the first switch 122 may be open and the second switch 212 closed in the open position of the door latch assembly 100.

Returning to FIG. 7, the catch assembly 204 may include a bearing 700 disposed between a top portion 704 and a bottom portion 706 of the catch assembly 204. The bearing 700 may be a needle bearing, for example. Other types of bearings may be used as well in other embodiments. The bearing 700 may be located at a protruding portion 228 of the catch assembly 204. The bearing 700 may freely rotate about a pin which defines a bearing axis 226, as shown in FIGS. 2 and 7.

Figure 6:
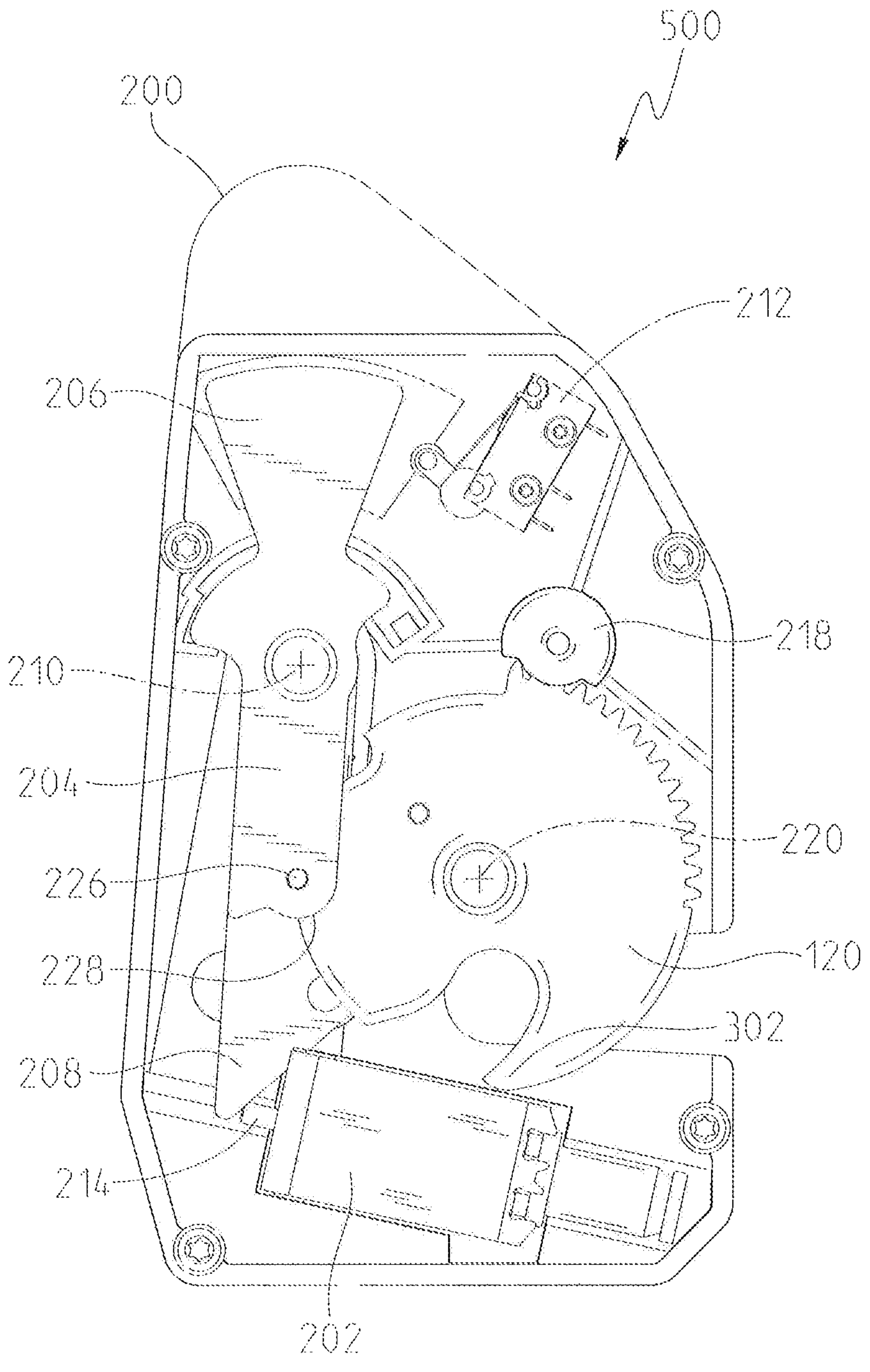
FIG. 6 is a partial section of the second side view of the door latch assembly in its closed position.

The top portion 704 and bottom portion 706 of the catch assembly 204 may define a recess 708 in which the rotor 120 may partially move into between the open and closed position of the door latch assembly 100. This is illustrated best in FIGS. 2, 4, and 6.

The rotor 120 may be rotatably driven about a rotor axis 220 as the door latch assembly 100 moves between the open and closed positions. In FIG. 2, the rotor 120 may include a plurality of teeth 216. The teeth 216 may be in a meshing engagement with corresponding teeth on a pinion gear 218. The pinion gear 218 may be rotatably driven by the geartrain assembly 106 when the clutch assembly 118 is engaged. When the clutch assembly 118 is disengaged, a torque path between the drive mechanism 104 and the pinion gear 218 is disconnected.

Figure 8B:
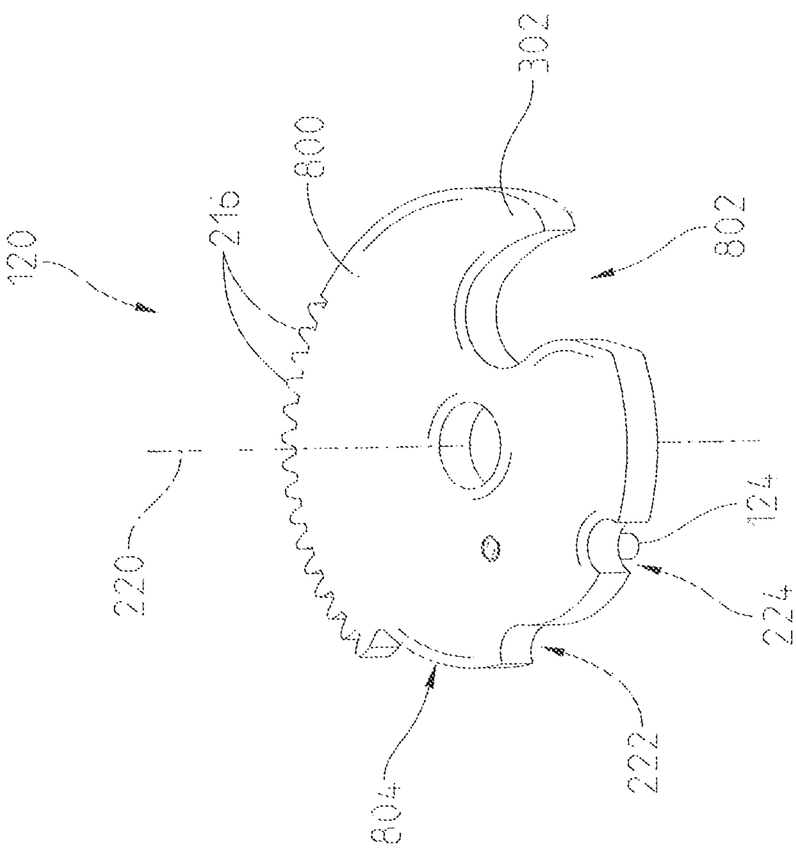
FIG. 8B is a perspective view of the rotor of FIG. 8A.
Figure 8A:
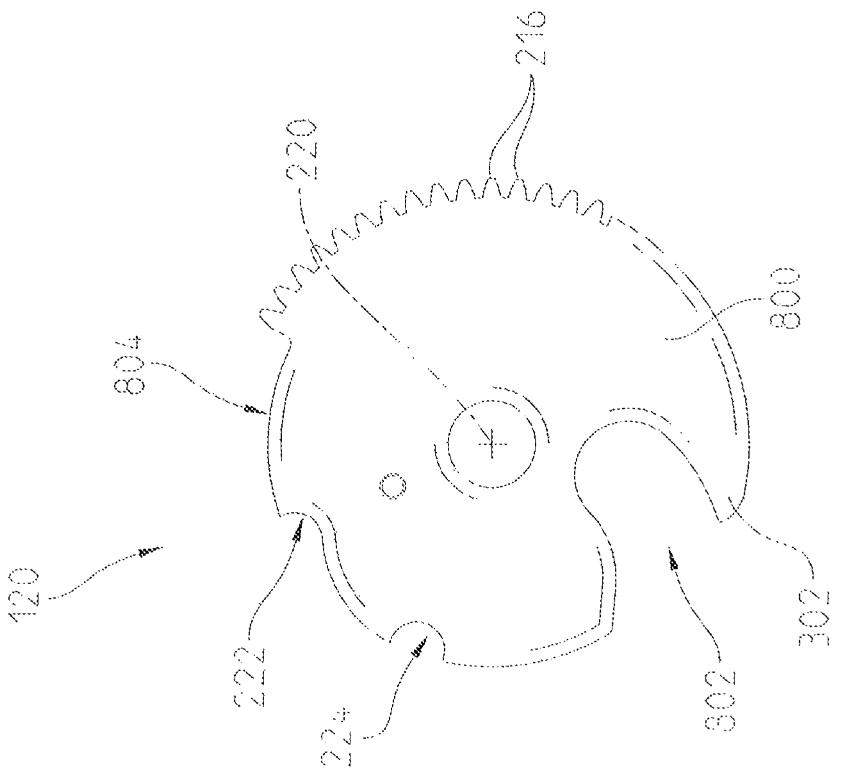
FIG. 8A is a top view of a rotor of the door latch assembly of FIG. 1.

The rotor 120 is more clearly illustrated in FIGS. 8A and 8B. As shown, the rotor 120 may include a generally circular body 800. The rotor body 800 includes the plurality of teeth 216 defined in an outer surface thereof. Opposite the plurality of teeth 216, the rotor body 800 may include a rotor tooth 302 as shown. The rotor tooth 302 may be spaced from the body 800 such that an opening 802 is defined. The opening 802 in the rotor 120 may partially correspond with the housing opening 134. When the door latch assembly 100 is in its open position, the opening 802 may at least partially align with the housing opening 134 so that a door striker or post may be received therein. When the striker or post engages the rotor 120 in the opening 802, the rotor 120 can pivot or rotate about its axis 220 such that the striker or post is located within the opening 802. The rotor tooth 302 may be rotated to a position such that it holds or maintains the striker or post in a latched position.

The rotor body 800 may also include an outer surface 804 with a first notch 222 and a second notch 224 defined therein. During movement of the door latch assembly 100 between its open position (FIGS. 1-2), intermediate position 300, and closed (or latched) position 500, the bearing 700 of the catch assembly 204 may be located in either notch or in proximate contact with the outer surface 804. This will be described in further detail below.

Figure 9:
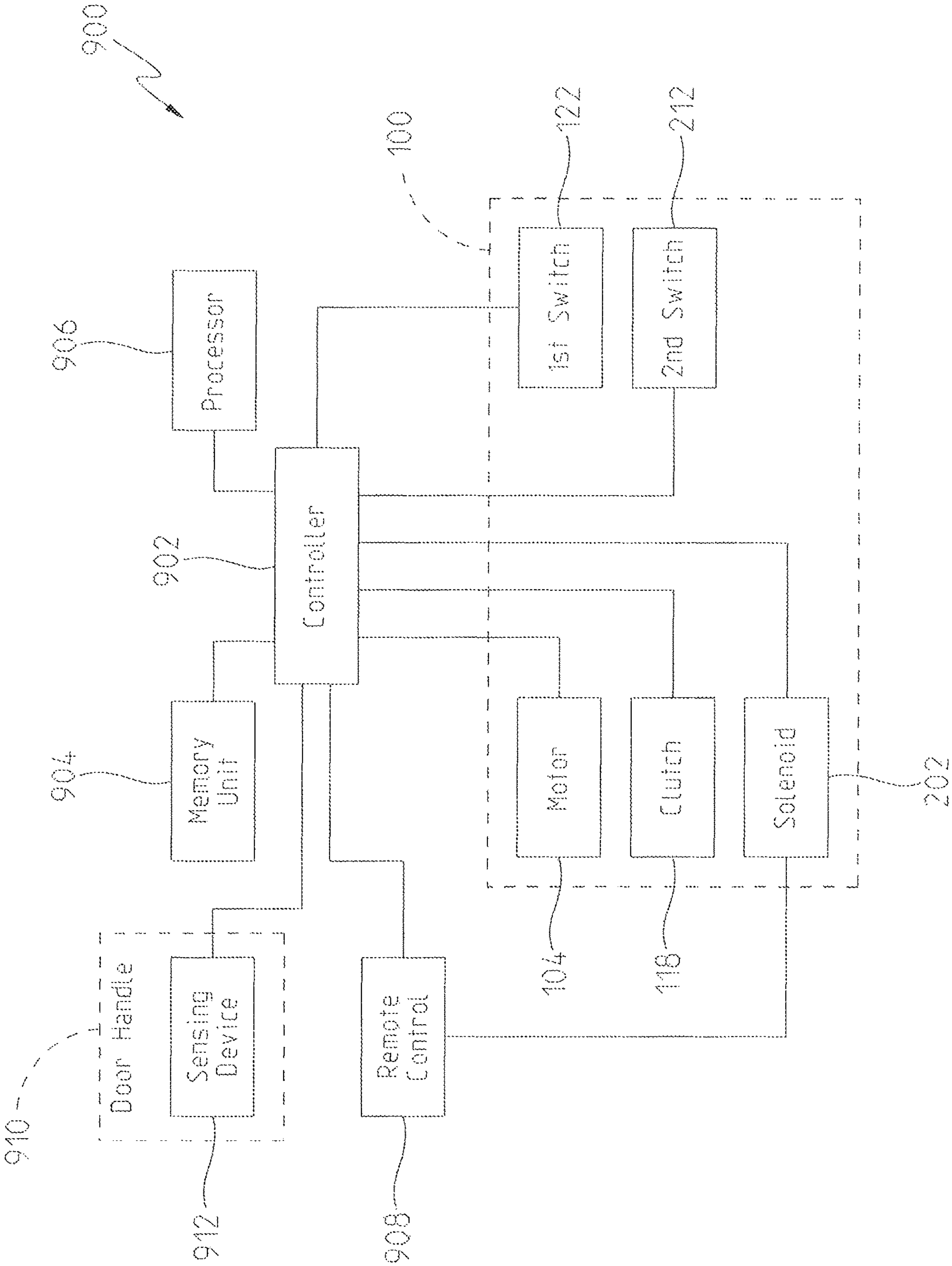
FIG. 9 is a diagram of a control system for controlling the door latch assembly of FIG. 1 according to the present disclosure.

The door latch assembly 100 of FIG. 1 may be part of an overall control system 900 as shown in FIG. 9. The control system 900 may include a controller 902, which includes a memory unit 904 and a processor 906. The memory unit 904 may include storage for storing a software program, control algorithm, control logic, lookup tables, graphical data, and the like for executing one or more functions on the vehicle. The control logic may include operating the door latch assembly 100. The processor 906 may be configured to execute the control logic stored in the memory unit 904.

The door (not shown) may include a door handle 910 which may be manually operated for opening the door. A sensing device 912 such as a switch or sensor may be coupled to or adjacent to the door handle 910. The sensing device 912, for example, may be a Hall Effect sensor capable of detecting a position of a latch or the like. The sensing device 912 may be in communication with the controller 902 for communicating the position of the door latch assembly 100. In one embodiment, the sensing device 912 may be a switch which is energized when the door latch assembly 100 is in one position (e.g., latched or unlatched), but it is de-energized when the door latch assembly 100 is in a different position. In another embodiment, the sensing device 912 may be sensor capable of detecting a position of the door latch assembly 100. In any event, the sensing device 912 is capable of detecting a position or state of the door handle and communicate this position to the controller 902.

In another embodiment, the sensing device 912 may be capable of detecting a position of a lock tumbler or mechanism of the door handle 910. The lock tumbler or mechanism (not shown) may be in at least a locked position or an unlocked position. The lock tumbler or mechanism may be movable via a key used by an operator who either locks or unlocks a door via the door handle of the machine. The sensing device 912 may thus be configured to detect the position of the lock tumbler or mechanism, and communicate the position to the controller 902.

In a further embodiment, the door (not shown) may include a remote control 908 for selectively operating the door latch assembly 100. Here, the remote control 908 can be electrically coupled to the controller 902 and/or solenoid 202. In an alternative embodiment, the remote control 908 may be electrically coupled to the motor (i.e., instead of the solenoid 202). In one embodiment, the remote control 908 may be electrically coupled to only the solenoid 202 (or motor) to selectively energize or de-energize the solenoid 202 (or motor). In another embodiment, the remote control 908 may be electrically coupled to only the controller 902. In this embodiment, an actuation of the remote control 908 may send a signal to the controller 902, which in turn sends a signal to energize the solenoid 202 (or motor). In a further embodiment, the remote control 908 may be electrically coupled to both the solenoid 202 (or motor) and the controller 902. In this embodiment, when the remote control 908 is actuated, a signal is communicated to both the solenoid 202 (or motor) and the controller 902. If, for some reason the signal from the remote control 202 does not energize the solenoid 202 or motor (e.g., a bad wiring connection or default), the controller 902 may detect this and communicate a signal to the solenoid 202 (or motor) to energize it.

In a different embodiment, when the sensing device 912 detects the lock tumbler is in a locked position, the sensing device may communicate this detected position to the controller 902. Upon doing so, the controller 902 may disable the remote control 908 to prevent it from energizing the solenoid of moving the door latch assembly to its unlatched position.

As previously described, many conventional door latch assemblies have a high release force thereby making it difficult to release the latch from the closed position. Due to the higher release force, which in some instances can be about 40 N, it can be difficult to release the catch assembly from the rotor. Without the bearing 700, for example, the catch assembly may have to be forced in a sliding movement relative to the rotor in order to open the door latch assembly. This sliding movement of the catch assembly against the rotor can result in a significant friction force, thus making it difficult to release the catch assembly. At this higher release force, the conventional door latch assembly often requires a larger solenoid to produce enough force to overcome the large friction force. The larger solenoid makes it difficult to package the entire latch assembly in a single housing.

In the embodiments of the present disclosure, however, the bearing 700 can reduce the friction force to about 5 N in some instances. This lower release force allows for a smaller solenoid (or motor) which can be packaged more compactly and in a modular arrangement with the door latch assembly 100. The bearing 700, which can be a needle bearing, may freely rotate about a pin and bearing axis 226.

In one embodiment, the door latch assembly 100 may include a remote release function such that the solenoid 202 (or motor) is used for controlling the releasing operation of the catch assembly 204 from the rotor 120. In this embodiment, the aforementioned remote control 908 may be provided for energizing the solenoid 202 (or motor) when an operator desires to open the door on the vehicle or machine. In a harvesting machine, for example, the remote control 908 may be a push button upon which a user exerts a force to initiate the power release. In any event, the bearing 700 can reduce the amount of force required to release the catch assembly from one of the notches in the rotor.

In a different embodiment, the door may be opened manually. In this instance, a door handle, lever, push button, or the like may be provided upon which a user pulls or otherwise manipulates for releasing the catch assembly 204 from the rotor 120. Even in the manual process, the bearing 700 helps reduce the amount of force required of the user to release the door latch assembly 100. In the event the door is opened manually and there is no remote control 908, then the door latch assembly 100 may be provided without a solenoid 202 (or motor). This can reduce the overall cost of the door latch assembly 100.

In the present disclosure, a return spring (not shown) may act against the catch assembly 204. The return spring may be positioned between a portion of the housing 200 adjacent the second switch 212 and the first end 206 of the catch assembly 204. The return spring is configured to bias the catch assembly 204 to rotate in the counterclockwise direction to the closed or fully latched position 500 of FIG. 6. Another advantage of the bearing 700 is the friction force is relatively small and thus the primary force to overcome to release the catch assembly 204 from the second notch 224 is the spring force. The spring force, however, can be less than the conventional friction force, thereby allowing for an easier release of the door latch assembly 100.

Referring to FIGS. 1 and 2, the door latch assembly 100 is configured in its open or unlatched position. Here, the first end 206 of the catch assembly 204 is positioned closest to the second switch 212 such that the second switch 212 is closed. As shown in FIG. 9, the controller 902 may be in communication with the second switch 212 to detect the position of the switch. Further, the bearing 700 may be in contact with the rotor outer surface 804. In other words, in the open or unlatched position of FIGS. 1 and 2, the bearing 700 is not disposed in a notch but rather is free to roll along or otherwise be in contact with the outer surface 804 of the rotor 120.

In the open or unlatched position, the rotor 120 is positioned such that the rotor opening 802 may be substantially aligned with the housing opening 134. In this position, the pair of openings may be partially aligned to allow a striker or post to be received in each opening when closing the door (not shown). The rotor 120 may be rotated about its axis 220 such that the second notch 224 is in close proximity to the solenoid 202 (or motor) and the rotor tooth 302 is located mostly outside of the opening 134. Moreover, the rotor pin 124 may be located at the first end 304 of the slot 126. In this location, the first switch 122 is open. The first switch 122 may be in communication with the controller 902 such that the controller 902 is able to detect when the first switch 122 is open or closed. In the open or unlatched position, the controller 902 may be able to detect that the first switch 122 is open and the second switch 212 is closed.

As described previously, the rotor 120 includes a first notch 222 and a second notch 224. When the bearing 700 is located in the first notch 222, the door latch assembly 100 may be disposed in an intermediate position 300 (i.e., between the open and closed positions). When the bearing 700 is located in the second notch 224, the door latch assembly 100 may be disposed in the closed or latched position 500.

When a user desires to close the door from its open or unlatched position, the door may be shut such that a striker or post enters the opening 134 in the housing 102 and the rotor opening 802 until it comes into contact with the rotor body 800. As the striker or post contacts the rotor body 800, it can induce the rotor 120 to rotate clockwise about its axis 220. As it does, the rotor tooth 302 rotates downwardly to capture the striker or post in the rotor opening 802. Rotation of the rotor 120 in the clockwise direction causes the bearing 700 to roll along the outer surface 804 of the rotor body 800 until it becomes disposed within the first notch 222 of the rotor 120.

At this point, the door latch assembly 100 is in its intermediate position 300. In the intermediate position, the rotor pin 124 is located at a location between the first end 304 and second end 306 of the slot 126. The first switch 122 is still open, and the movement of the bearing 700 into the first notch 222 causes the catch assembly 204 to pivot about its axis 210 such that the first end 206 thereof is no longer in contact with the second switch 212. Thus, the second switch 212 is now open. Once the first switch 122 and second switch 212 are open, the controller 902 may detect this arrangement and triggers the drive mechanism 104 (e.g., electric motor) to provide torque to the geartrain assembly 106. The controller 902 may be controlled via control logic in the memory unit 904 which commands the controller 902 to actuate the drive mechanism 104 when both switches are open. The controller 902 may further trigger the clutch assembly 118 to move to its engaged or connected configuration. When the clutch assembly 118 is disengaged or disconnected, the rotor 120 is able to freely rotate about its axis 220. When the clutch assembly 118 is engaged or connected, the drive mechanism 104 is able to rotate the rotor 120 as desired. In other words, upon engaging the clutch assembly 118, the drive mechanism 104 can provide torque through the geartrain assembly 106 and the clutch assembly 118 to drive the rotor 120 via the pinion gear 218.

As the drive mechanism 104 provides power to drive the rotor 120, the rotor 102 may continue to rotate about its axis 220 in a clockwise direction until the bearing 700 moves out of the first notch 222 and into the second notch 224. As the bearing 700 moves out of the first notch 222, it is able to rotate about its own bearing axis 226. This rotation can reduce the friction between the catch assembly 204 and the rotor 120, thereby allowing for an easier transition between positions.

Once the catch assembly 204 is moved to its closed position, i.e., where the first end 206 is furthest from the second switch 212 and the bearing 700 is located in the second notch 224, the controller 902 may detect that the second switch 212 is still open. However, in the closed position 500, the rotor 120 is rotated to its furthest clockwise position such that the rotor pin 124 is located at the second end 306 of the slot 126. Here, the first switch 122 may be closed, which is detectable by the controller 902. With the first switch 122 closed and the second switch 212 open, the controller 902 may detect that the door latch assembly 100 is in its closed or latched position 500 and the controller 902 can deactivate or shut off the drive mechanism 104 and disengage the clutch assembly 118.

Once the door latch assembly 100 is closed or latched, it may be released either remotely or manually as previously described. For example, a user may actuate a door handle which may be coupled to the rotor 120 through the manual release opening 128. If the door is opened manually, the door latch assembly 100 may not include a solenoid. In this case, the user may manually open the door by moving the catch 204 in a clockwise direction such that the bearing 700 is released from the second notch 224 and moves into contact with the outer surface 804 of the rotor body 800 without being located in either notch thereby allowing the rotor 120 to freely turn or rotate in the counterclockwise direction. The bearing 700, particularly a needle bearing, helps facilitate the release from the second notch 224 due to its ability to rotate about its axis 226. Thus, the user does not have to exert as large of a force against the handle to release the catch member 204 from the rotor 120.

Alternatively, a user may trigger a remote control 908. Upon triggering the remote control 908, a signal may be communicated directly to the solenoid 202 (or motor) or a signal may be sent to the controller 902 which in turn energizes the solenoid 202 (or motor). Once the solenoid 202 (or motor) is energized, the solenoid 202 (or motor) may actuate its plunger 214 (or element) to move outwardly and contact the second end 208 of the catch assembly 204. As it does, the plunger 214 can move the second end 208 of the catch assembly 204 to the left such that the catch assembly 204 pivots about its axis 210 in a clockwise direction. This again causes the bearing 700 to become dislodged from the second notch 224 and move into contact with the outer surface 804 of the rotor body 800 without being located in either notch. When the door latch assembly 100 is unlatched, the bearing 700 does not become disposed in the first notch 222. In other words, at least in this embodiment, the door latch assembly 100 is actuated from its latched position directly to its unlatched position without being in the intermediate position. However, in alternative embodiments, the door latch assembly 100 may function such that it can be actuated from the latched position to the intermediate position and then to the unlatched position. If the door latch assembly 100 is configured to move from the latched position to the intermediate position in this embodiment, then the controller 902 may activate the drive mechanism 104 and engage the clutch assembly 118 in a similar manner as described above. Here, however, the rotor 120 would be operably rotated by the drive mechanism 104 in an opposite direction (e.g., counterclockwise direction).

Regardless of whether the door latch assembly 100 is released from its closed position manually or via the remote control 908, the rotor pin 124 is moved through the slot 126 from the second end 306 to the first end 304. As it does, the first switch 122 is open and the second switch 212 is closed. Thus, the controller 902 may detect that the second switch 212 is in its closed position. As it does, the door latch assembly 100 may be in its open or unlatched position of FIGS. 1 and 2, and the rotor is able to freely rotate about its pivot axis 220. Moreover, the rotor opening 802 may be at least partially aligned with the housing opening 134 such that a striker or post may be received therein when closing the door.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A door latch assembly, comprising:
- a housing;
- a controller;
- a drive mechanism disposed within the housing, the drive mechanism being controllable to provide output torque;
- a geartrain assembly operably driven by the drive mechanism;
- a clutch assembly controllable between a disengaged position and an engaged position;
- a rotor comprising a body rotatably coupled to the housing, the body having an outer surface and at least two notches defined in the outer surface;
- a catch assembly rotatably coupled to the housing, the catch assembly including a first end and a second end;
- a sensing device that detects a position of a lock mechanism, the sensing device communicably coupled with the controller to disable a remote control when the lock mechanism is in a locked state; and
- a bearing rotatably coupled to the catch assembly;

wherein:
- in a first position, the bearing is disposed in the first notch;
- in a second position, the bearing is disposed in the second notch;
- in a third position, the bearing is located in neither notch.

2. The door latch assembly of claim 1, further comprising an activatable device located within the housing, the activatable device including a movable mechanism which is movable between an extended and retracted position.

3. The door latch assembly of claim 2, wherein:
- the activatable device is controllable between an energized state and a de-energized state;
- in the de-energized state, the movable mechanism is in its retracted position and spaced from the catch assembly;
- in the energized state, the movable mechanism is in its extended position and moves into contact with the catch assembly.

4. The door latch assembly of claim 3, further comprising a remote control for controlling the activatable device from its de-energized state to its energized state.

5. The door latch assembly of claim 1, wherein the housing comprises an opening for a manual release mechanism for moving the bearing between the first notch and the second notch.

6. The door latch assembly of claim 1, wherein:
- the rotor is rotatable about a first axis;
- the catch assembly is rotatable about a second axis;
- the bearing is rotatable about a third axis;
- the first, second and third axes are offset but parallel to one another.

7. The door latch assembly of claim 1, further comprising:
- a slot defined in the housing, the slot including a first end and a second end;
- a pin integrally formed in the rotor, the pin moving through the slot between the first and second ends as the door latch assembly is configured between an unlatched position and a latched position.

8. The door latch assembly of claim 1, wherein the drive mechanism comprises an electric motor.

9. The door latch assembly of claim 1, further comprising a pinion gear coupled to the rotor such that when the clutch assembly is in its engaged position, output torque from the drive mechanism is transferred through the geartrain assembly, the clutch assembly, and the pinion gear to rotatably drive the rotor.

10. The door latch assembly of claim 1, wherein:

the housing comprises a first opening configured to receive a striker on a door frame;

the rotor comprises a second opening configured to receive the striker in an unlatched position of the door latch assembly;

further wherein, the first opening and second opening are at least partially aligned with one another in the unlatched position.

11. The door latch assembly of claim 1, further comprising a pair of switches movable between an open position and a closed position;

wherein, in the first position, the pair of switches are in their open positions;

wherein, in the second position, a first switch of the pair of switches is in the closed position and a second switch of the pair of switches in the open position;

wherein, in the third position, the first switch is in the open position and the second switch is in the closed position.

12. A door latch assembly of a work machine positionable between an unlatched position, an intermediate position, and a latched position, the door latch assembly comprising:

a housing defining an interior space;

a controller;

a drive mechanism disposed within the interior space, the drive mechanism being controllable to produce output torque;

a rotor pivotally coupled to the housing and disposed within the interior space, the rotor comprising an outer surface which includes at least two notches defined therein;

a catch assembly pivotally coupled to the housing and disposed within the interior space;

a bearing rotatably coupled to the catch assembly; and a sensing device that detects a position of a lock mechanism, the sensing device communicably coupled with the controller to disable a remote control when the lock mechanism is in a locked state;

wherein, in the unlatched position, the bearing is located in contact with the outer surface but not within either of the at least two notches;

wherein, in the intermediate position, the bearing is located in a first notch of the at least two notches;

wherein, in the latched position, the bearing is located in a second notch of the at least two notches.

13. The door latch assembly of claim 12, further comprising a pair of switches movable between an open position and a closed position;

wherein, in the intermediate position, the pair of switches are in their open positions;

wherein, in the unlatched position, a first switch of the pair of switches is in the closed position and a second switch of the pair of switches in the open position;

wherein, in the latched position, the first switch is in the open position and the second switch is in the closed position.

14. The door latch assembly of claim 13, further comprising a slot defined in the housing, the slot including a first slot end and a second slot end such that the rotor moves within the slot between the first and second slot ends;

wherein, in the unlatched position, the rotor is located at the first slot end;

wherein, in the intermediate position, the rotor is located between the first and second slot ends;

wherein, in the latched position, the rotor is located at the second slot end.

15. The door latch assembly of claim 12, further comprising a activatable device located within the housing, the activatable device including a movable mechanism which is movable between an extended position and retracted position.

16. The door latch assembly of claim 12, wherein:

the rotor pivots about a first axis and the catch assembly pivots about a second axis;

the rotor pivots about the first axis in a first direction and the catch assembly pivots about the second axis in a second direction when the door latch assembly is moved from the unlatched position to the latched position;

the rotor pivots about the first axis in the second direction and the catch assembly pivots about the second axis in the first direction when the door latch assembly is moved from the latched position to the unlatched position.

17. A control system of a work machine, comprising:

a controller;

a door latch assembly being controllable between an unlatched position, an intermediate position, and a latched position, the door latch assembly comprising:

a housing defining an opening for receiving a striker and a slot having a first slot end and a second slot end;

a drive mechanism disposed within the housing, the drive mechanism being controllable to provide output torque;

a geartrain assembly operably driven by the drive mechanism;

a clutch assembly controllable between a disengaged position and an engaged position;

a rotor comprising a body pivotally coupled to the housing, the body having an outer surface and at least two notches defined in the outer surface;

a catch assembly pivotally coupled to the housing, the catch assembly including a first end and a second end;

a bearing rotatably coupled to the catch assembly;

an activatable device located within the housing, the activatable device including a movable mechanism which is movable between an extended position and retracted position;

a remote control disposed in communication with the controller or activatable device, the remote control being actuable to energize the activatable device to move the door latch assembly from the latched position to the unlatched position;

a handle for manually opening a door of the work machine, the handle including a lock mechanism movable between a locked state and an unlocked state; and a sensing device disposed in communication with the controller, the sensing device adapted to detect a position of the lock mechanism in either the locked state or the unlocked state, the sensing device communicating the state to the controller;

wherein, in the unlatched position, the bearing is in contact with the outer surface of the rotor and the rotor is located at the first slot end of the slot, in the intermediate position, the bearing is disposed in a first notch of the at least two notches and the rotor is located between the first slot end and the second slot end, an in the latched position, the bearing is disposed in a second notch of the at least two notches and the rotor is located at the second slot end;

wherein, when the activatable device is energized, the movable mechanism is moved from its retracted position to its extended position, and in the extended position, the movable mechanism contacts the catch assembly to pivot it about a first pivot axis such that the bearing is moved from being disposed in the second notch to being disposed on the outer surface of the rotor and without being disposed within any of the at least two notches;

wherein, the controller disables the remote control when the sensing device detects the lock mechanism is in the locked state.

18. The control system of claim 17, wherein:

from the unlatched position, the rotor is operably pivoted about a first axis to induce movement of the bearing from not being disposed in any of the at least two notches to being located within the first notch;

the controller operably detects the bearing being in the first notch and activates the drive mechanism and engages the clutch assembly to transfer output torque from the drive mechanism through the geartrain assembly and clutch assembly to the rotor for pivoting the rotor about the first pivot axis;

as the rotor pivots about the first pivot axis due to the output torque from the drive mechanism, the pivotal movement of the rotor moves the rotor to the second slot end and induces pivotal movement of the catch assembly such that the bearing rotatably moves out of the first notch and into the second notch.

* * * * *